(12) United States Patent
Narayan et al.

(10) Patent No.: US 6,564,198 B1
(45) Date of Patent: May 13, 2003

(54) FUZZY EXPERT SYSTEM FOR INTERPRETABLE RULE EXTRACTION FROM NEURAL NETWORKS

(75) Inventors: Srinivasa Narayan, Moorpark, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/504,641

(22) Filed: Feb. 16, 2000

(51) Int. Cl.$^7$ ............................................... G06F 17/00
(52) U.S. Cl. ...................................................... 706/60
(58) Field of Search ............................ 706/60, 16, 45, 706/23; 707/532, 1; 704/9

(56) References Cited

U.S. PATENT DOCUMENTS

| | | | | |
|---|---|---|---|---|
| 4,730,259 A | * | 3/1988 | Gallant | 706/16 |
| 5,299,285 A | | 3/1994 | Tawel | 706/25 |
| 5,398,300 A | * | 3/1995 | Levey | 706/16 |
| 5,438,644 A | | 8/1995 | Fu | 706/12 |
| 5,465,320 A | * | 11/1995 | Enbutsu et al. | 706/23 |
| 5,475,589 A | * | 12/1995 | Armitage | 702/13 |
| 5,619,709 A | * | 4/1997 | Caid et al. | 707/532 |
| 5,701,400 A | * | 12/1997 | Amado | 706/45 |
| 5,768,137 A | * | 6/1998 | Polidoro et al. | 700/186 |
| 5,794,178 A | * | 8/1998 | Caid et al. | 704/9 |
| 5,867,799 A | * | 2/1999 | Lang et al. | 707/1 |
| 5,874,955 A | * | 2/1999 | Rogowitz et al. | 345/589 |

OTHER PUBLICATIONS

An approach to rule–based knowledge extraction, Yaochu Jin; von Seelen, W.; Sendhoff, B., Fuzzy Systems Proceedings, 1998. IEEE World Congress on Computational Intelligence., The 1998 IEEE International Conference on, vol. 2:, 1998, pp.: 1188–1193.*

Rule–based knowledge in neural computing, Hollatz, J., Grammatical Inference: Theory, Applications and Alternatives, IEEE Colloquium on, 1993, pp.: 19/1–19/8.*

A fuzzy neural network learning fuzzy control rules and membership functions by fuzzy error backpropagation, Nauck, D.; Kruse, R., Neural Networks, 1993., IEEE International Conference on, 1993, pp.: 1022–1027 vol. 2.*

Generalized Analytic Rule Extraction for feedforward neural networks, Gupta, A.; Sang Park; Lam, S.M. Knowledge and Data Engineering, IEEE Transactions on, vol.: 11, Issue: 6, Nov.–Dec. pp.: 985–991.*

Symbolic interpretation of artificial neural networks, Taha, I.A.; Ghosh, J., Knowledge and Data Engineering, IEEE Transactions on, vol.: 11 Issue: 3, May–Jun. 1999, pp.: 448–463.*

Performance evaluation of fuzzy classifier systems for multidimensional pattern classification problems, Ishibuchi, H.; Nakashima, T.; Murata, T., Systems, Man and Cybernetics, Part B, IEEE Transactions on, vol.: 29 Issue: 5, Oct. 1999 pps: 601–618.*

(List continued on next page.)

*Primary Examiner*—John A. Follansbee
*Assistant Examiner*—Michael B. Holmes
(74) *Attorney, Agent, or Firm*—Tope-McKay & Associates (57) ABSTRACT

An method and apparatus for extracting an interpretable, meaningful, and concise rule set from neural networks is presented. The method involves adjustment of gain parameter, $\lambda$ and the threshold, $T_j$ for the sigmoid activation function of the interactive-or operator used in the extraction/development of a rule set from an artificial neural network. A multi-stage procedure involving coarse and fine adjustment is used in order to constrain the range of the antecedents of the extracted rules to the range of values of the inputs to the artificial neural network. Furthermore, the consequents of the extracted rules are provided based on degree of membership such that they are easily understandable by human beings. The method disclosed may be applied to any pattern recognition task, and is particularly useful in applications such as vehicle occupant sensing and recognition, object recognition, gesture recognition, and facial pattern recognition, among others.

19 Claims, 8 Drawing Sheets

OTHER PUBLICATIONS

A data–driven rule–based neural network model for classification, Smith, K.A., Neural Information Processing, 1999. Proceedings. ICONIP '99. 6th International Conference on, vol.: 3 , 1999, pp.: 855–860 vol. 3.*

A fuzzy learning model for membership function estimation and pattern classification Fu–Lai Chung; Tong Lee, Fuzzy Systems, 1994. IEEE World Congress on Computational Intelligence., Proceedings of the Third IEEE Conference on, 1994, pp.: 426–1, vol. 1.*

Interpretation of nodes in networks for fuzzy logic, Keller, J.M.; Hayashi, Y.; Chen, Z., Fuzzy Systems, 1993., Second IEEE International Conference on, 1993, pp.: 1203–1207 vol. 2.*

Neuro–fuzzy in legal reasoning, Hollatz, J., Fuzzy Systems, 1995. International Joint Conference of the Fourth IEEE International Conference on Fuzzy Systems and The Second International Fuzzy Engineering Symposium., Proceedings of 1995 IEEE, vol. 2.*

On the condition of adaptive neurofuzzy models, Brown, M.; An, P.E.; Harris, C.J., Fuzzy Systems, 1995. Intl. Joint Conference of the Fourth IEEE Intl. Conference on Fuzzy Systems and The Second Intl. Fuzzy Engineering Symposium, pp. 663–670.*

When local isn't enough: extracting distributed rules from networks, Medler, D.A.; McCaughan, D.B.; Dawson, M.R.W.; Willson, L., Neural Networks, 1999. IJCNN '99. International Joint Conference on, vol.: 2, 1999, pp. 1174–1179.*

Fuzzy rule extraction from a multilayered neural network, Enbutsu, I.; Baba, K.; Hara, N., Neural Networks, 1991., IJCNN–91–Seattle International Joint Conference on , vol.: ii, (1991) pp.: 461–465 vol. 2.*

A fuzzy expert system for durability assessment of bridge decks, Furuta, H.; Umano, M.; Kawakami, K.; Ohtani, H.; Shiraishi, N. Uncertainty Modeling and Analysis, 1990. Proceedings., First International Symposiumon , 1991, pp.: 522–527.*

Benitez, J.M., et al. "Are Artificial Neural Networks Black Boxes?" IEEE Transactions on Neural Networks, IEEE, Inc., New York, US, vol. 8, No. 5, Sep. 1, 1997, pp. 1156–1164, XP000699325.

Narazaki, H., et al. "Reorganizing Knowledge in Neural Networks: an Explanatory Mechanism for Neural Networks in Data Classification Problems", IEEE Transactions on Systems. Man and Cybernetics, Part B: Cybernetics, IEEE Service Center, US, vol. 26, No. 1, Feb. 1, 1996, pp. 107–117, XP000582905.

J. M. Benitez, J. L. Castro, and I. Requena, "Are Artificial Neural Networks Black Boxes?", IEEE Transactions on Neural Networks, vol. 8 No. 5, Sep. 1997.

Li Min Fu, "Rule Generation from Neural Networks", IEEE Transactions on Systems, MAN, and Cybernetics, vol. 24, No. 8, Aug. 1994.

J. Mao and A. K. Jain, "Artificial Neural Networks for Feature Extraction and Multivariate Data Projection", IEEE Transactions on Neural Networks vol. 6, No. 2, Mar. 1995.

* cited by examiner

FIG. 1

| Row | $X_1$ | $X_2$ | $X_1$ I-OR $X_2$ |
|-----|-------|-------|------------------|
| 1 | 0.01 | 0.99 | 0.5 |
| 2 | 0.4 | 0.6 | 0.5 |
| 3 | 0.3 | 0.7 | 0.5 |
| 4 | 0.1 | 0.3 | 0.05 |
| 5 | 0.05 | 0.4 | 0.03 |
| 6 | 0.6 | 0.8 | 0.86 |
| 7 | 0.55 | 0.9 | 0.92 |

Shape of the sigmoidal activation function $f(x) = (1/(1 + e^{-(\lambda wx+T)}))$ for various values of the gain parameter $\lambda$.

| Data Type | Accuracy (%) | | Number of Rules | | Number of Antecedents per rule | | Interpretability of rules | |
|---|---|---|---|---|---|---|---|---|
| | Expert System from [1] | Our Expert System | Expert System from [1] | Our Expert System | Expert System from [1] | Our Expert System | Expert System from [1] | Our Expert System |
| Occupant Position | 97.9 | 98.3 | 15 | 15 | 40 | 20 | No | Yes |
| Occupant Recognition | 99.0 | 99.4 | 15 | 15 | 40 | 19 | No | Yes |

Where [1] represents the system of Benitez et al., and "Our Expert System" represents the system of the present invention.

FIG. 8

FUZZY EXPERT SYSTEM FOR INTERPRETABLE RULE EXTRACTION FROM NEURAL NETWORKS

TECHNICAL FIELD

The present invention relates generally to data processing systems and methods. More specifically, it relates to an artificial neural network-generated fuzzy expert system from which an accurate, compact, interpretable, and meaningful set of rules may be extracted.

BACKGROUND OF THE INVENTION

There are many approaches to data processing for developing rule sets for pattern recognition from provided data. Typical approaches utilize artificial neural networks (ANNs) or decision tree methods such as C5. The basic structure of an ANN comprises many layers of processing elements, which are referred to as neurons. The neurons in these many layers are interconnected by links that are assigned weight values during training. The weighted values are then interpreted to form rules to approximate the data. Data processing approaches such as the aforementioned find many uses in pattern recognition operations such as automotive occupant sensing and recognition, facial pattern recognition, gesture recognition, and object recognition, among others.

In some applications, such as automotive occupant sensing and recognition in particular, efficient operation is a key factor in success. In order to be practical, these methods must satisfy four critical constraints. The first constraint is that the methods must be extremely accuarate so that they can correctly handle the large number of finely differentiated possible geometric configurations for a vehicle occupant. The second constraint is that the method must have a fast response time. This is required to provide sufficient time for deployment of mechanical hardware, such as airbag systems, during collisions/accidents. The third constraint is that the method allow for the rationale for its actions under various situations to be understood and interpreted by humans. Human understanding and interpretation of occupant sensing and recognition methods is very important for product development, support, and analysis purposes. The last constraint is that the method must be inexpensive to implement in hardware. This is necessary to allow feasible implementation in an automobile and to provide an economic competitive advantage in the marketplace.

ANNs and C5 decision tree networks have previously been applied to pattern recognition operations. With regard to ANNs, the main disadvantage is the inability to explain learned knowledge from ANNs in a manner that can be easily understood by humans. As stated before, the ability to generate explainable rules is important for product development, support, and analysis purposes. The C5 decision tree network satisfies the aforementioned constraints to a degree. However, it is still desirable to provide a greater degree of accuracy and a more compact rule set.

ANNs, while capable of providing compact, highly accurate rule sets, have been criticized as being "black boxes" because their behavior has historically been unexplainable. In the article entitled "Are Artificial Neural Networks Black Boxes?", IEEE Transactions on Neural Networks, Vol. 8, No. 5, September 1997, incorporated herein by reference, Benitez, Castro, and Requena attempted to solve this problem by developing a new fuzzy-logic operator termed the interactive-or, or I-OR, operator. The interactive-or operator may be used to derive fuzzy rules from a fully trained ANN. While the method developed by Benitez et al. is able to extract fuzzy rules, the rules are not easily interpretable by humans because there is no assurance that the values of the input features, as reflected in the antecedents, of each fuzzy rule will fall within the allowable range of each input feature. In fact, although a particular antecedent may be unimportant to a particular rule, in many cases, all of the antecedents may exceed the range used to train the neural network. Finally, the output values, or consequents, are expressed as numeric values, further reducing the interpretability of the extracted rules.

Figure 1:
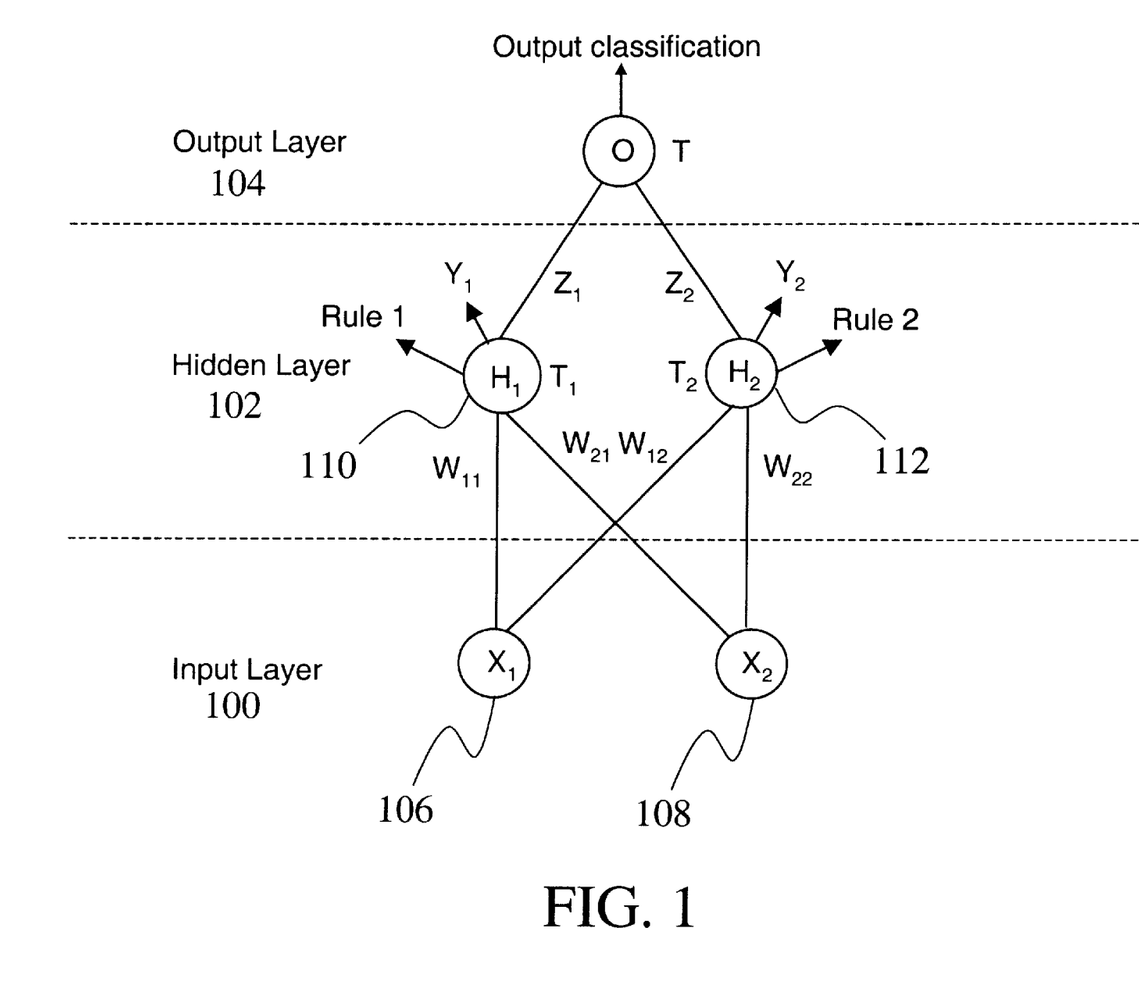
FIG. 1 provides a nodal and layer representation of an artificial neural network depicting the input layer, the hidden layer, and the output layer.

A simplified example of a three-layered ANN, comprising an input layer 100, a hidden layer 102, and an output layer 104 is shown in FIG. 1. As shown, the input layer 100 includes two input nodes, $X_1$ 106 and $X_2$ 108, which provide data to the network. The hidden layer 102 includes two hidden layer nodes, $H_1$ 110 and $H_2$ 112. The hidden layer nodes $H_1$ 110 and $H_2$ 112 each correspond to a unique fuzzy rule where, in the general case, the total number of hidden layer nodes $H_j$ corresponds to the total number of rules j in the system. As shown in the diagram, the hidden layer nodes, $H_1$ 110 and $H_2$ 112 also provide the output variables $Y_1$ and $Y_2$ for the generation of the rule base. In the example of FIG. 1, therefore, there are two rules in the rule base because there are two hidden layer nodes, $H_1$ 110 and $H_2$ 112. Specifically, are as many rules j as there are nodes in the hidden layer 102. According to the work of Benitez et al., the rules j for the hidden layer nodes, $H_1$ 110 and $H_2$ 112 may be formulated as:

Rule 1: IF $\{X_1 \text{ is } A_1\}$ I-OR $\{X_2 \text{ is } B_1\}$ THEN $\{Y_1 \text{ is } C_1\}$ and Rule 2: IF $\{X_1 \text{ is } A_2\}$ I-OR $\{X_2 \text{ is } B_2\}$ THEN $\{Y_2 \text{ is } C_2\}$, where $\{A_i, B_i, C_i\}$ represent the fuzzy sets that describe the input variables $\{X_1, X_2\}$ and the output variables $\{Y_1, Y_2\}$ for each rule. The terms in brackets { } to the left of THEN correspond to the "antecedents" for each rule. The terms in brackets { } to the right of THEN correspond to the "consequents" for each rule. In general, there are as many antecedents as inputs $X_i$ in the input layer 100 with i−1 interactive or terms between them. Thus, given two inputs $X_1$ and $X_2$, two antecedents would be combined into rules as shown above for the two input case with one I-OR term between them.

The rules above appear similar to rules found in traditional fuzzy logic systems, except for the presence of the I-OR terms. Two important features in the rule formulation above add clarity to the similarity between traditional fuzzy logic systems and the I-OR function. The first feature relates to the explainability of the rules. In a traditional fuzzy logic system, fuzzy sets are expressed in terms of linguistic labels such as SMALL, TALL, etc., and not with numeric values. Thus, they are more readily understandable and interpretable by humans. The analogous interpretation for the fuzzy set of each antecedent (e.g. ($A_1$ and $B_1$) in the Rule 1, above) for a given rule j was derived from the neural network described in the work of Benitez et al. to be of the form "$X_i$ is greater/lower than approximately $(2.2-T_j/2)/W_{ij}$". The value of 2.2 was obtained by inverting the unipolar sigmoidal activation function, $$f(x) = \frac{1}{1 + e^{-W_{ij}X_i + T_j}}$$

at an activation value (chosen at 0.9). The unipolar sigmoidal activation function serves as the membership function for each fuzzy set, similar to the trapezoidal/triangular membership functions found in fuzzy logic systems. It is important to note that the sigmoidal function may take any applicable form, and may be unipolar or bipolar as desired. The term $W_{ij}$ corresponds to the weight between the input node $X_i$ and the hidden layer node $H_j$ used in the generation of the rule j, and the appearance of the "greater" or "lesser" term depends on whether $W_{ij}$ is positive or negative, respectively. The threshold $T_j$ for a given rule rule j is equally partitioned between all of its antecedents. The consequents $C_j$ are directly set to the weight values $Z_j$ (i.e., no linguistic label). The second feature concerns the manner in which antecedents of a rule are combined to form a fuzzy rule. In fuzzy logic-based systems, the antecedents are combined using the AND/OR operators. However, as discussed in the article "The Representation of Fuzzy Relational Production Rules", Applied Intelligence, Vol. 1, Issue 1, p. 35–42 1991 by R. R. Yager, it has been proven that AND/OR operators are unsuitable for combining the antecedents of rules derived from an artificial neural network. Instead, a new fuzzy logic operator called the interactive-or (I-OR) operator has been derived. The I-OR of N input features $(X_1, \ldots, X_N)$ is of the form:

$$X_1 * X_2 * \ldots * X_N = X_1 X_2 \ldots X_N / (X_1 X_2 \ldots X_N + (1 - X_1) \ldots (1 - X_N)),$$

where the asterisks (*) represent the I-OR operation.

Figure 2:
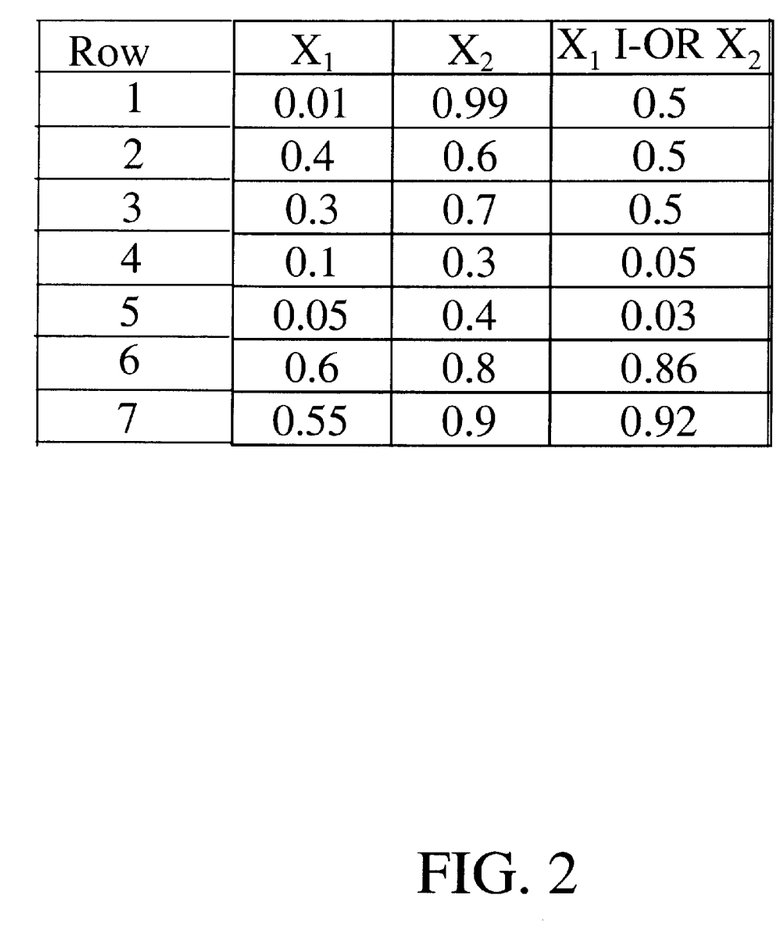
FIG. 2 provides a tabular representation of the I-OR characteristic between two variables $X_1$ and $X_2$ as developed by Benitez et al.

An I-OR between two input features $X_1$ and $X_2$ is characterized by the truth table shown in FIG. 2. The input features are in the range (0, 1) and the resulting I-OR of the two inputs is also between 0 and 1. The truth table shows the I-OR operator for specific examples of a two input case. Rows one to three from the top of the table demonstrate that when two inputs are biased to opposite extremes, the I-OR is indecisive (0.5). Rows four through seven from the top of the table show that if two inputs are biased in a fuzzy way towards one extreme, then the I-OR result is biased towards the more extreme of the two inputs.

An undesirable effect of rule extraction using the method developed by Benitez et al. is that the values of inputs in each of the antecedents are not constrained to be within the range of the input values that were used to train the neural network. For example, if the input $X_i$ 112 in FIG. 1 was in the range of 0 to 140 during training of the neural network, the antecedent of a rule extracted could read something like "If $\{X_1$ is greater than approximately 156$\} \ldots$" While it is arguable that the particular antecedent in question may be unimportant to the rule, it was observed that for several rules extracted, all of the antecedents exceeded the range used to train the neural network. Furthermore, the consequents are simply set to the numeric values based on weights that connect each rule to the output layer. This further reduces clarity of the rules. In order to make the rules meaningful, it is desirable to provide a means of interpretation for the rules, which constrains the antecedents to the range used to train the neural network, and which provides interpretable consequents.

Therefore, it is an object of the present invention to overcome the aforementioned limitations by providing a method for developing a readily interpretable and compact rule set which yields a high degree of accuracy for pattern recognition.

SUMMARY OF THE PRESENT INVENTION

The present invention provides a method and an apparatus for automatically generating a fuzzy expert system for occupant sensing and recognition in fixed spaces such as vehicles, as well as fuzzy rule sets extracted therefrom. The expert system is derived in the form of fuzzy rules that are extracted from an artificial neural network. The artificial neural network is trained on data collected in an automobile using a multi-beam range profile sensor. The rules derived for the fuzzy expert system can explain the learned knowledge from the neural network in a comprehensible manner. Additionally, the developed rule set/base is compact in, size and has a prediction accuracy that is better than, or at worst, equal to the prediction accuracy of the neural network from which it was derived.

Specifically, the method present invention comprises the following steps: Providing a neural network having a latent variable space and an error rate, with the neural network further including a sigmoid activation function having an adjustable gain parameter $\lambda$; iteratively adjusting the adjustable gain parameter $\lambda$ to minimize the error rate of the neural network, producing an estimated minimum gain parameter value $\lambda_{est}$; using the estimated minimum gain parameter value $\lambda_{est}$ and a set of training data to train the neural network; and projecting the training data onto the latent variable space to generate output clusters having cluster membership levels and cluster centers, with the cluster membership levels being determined as a function of proximity with respect to the cluster centers.

The iterative adjustment of adjustable gain parameter $\lambda$ may be further defined by the sub-steps of:

i. providing a validation data set;

ii. setting an initial gain parameter value $\lambda_{init}$, a current gain parameter value $\lambda_{curr}$, a final gain parameter value $\lambda_{final}$, a gain incrementing value $\Delta\lambda$, and an estimated minimum gain parameter value $\lambda_{est}$;

iii. setting the current gain parameter value $\lambda_{curr}$ equal to the initial gain parameter value $\lambda_{init}$;

iv. setting the estimated minimum gain parameter value $\lambda_{est}$ equal to the initial gain parameter value $\lambda_{init}$;

v. training the neural network using the current gain parameter value $\lambda_{curr}$ to provide a trained neural network;

vi. inputting the validation data set into the trained neural network to generate an output data set;

vii. comparing the output data set generated by the trained neural network to the validation data set to determine the prediction error rate of the trained neural network;

viii. resetting the current gain parameter value $\lambda_{curr}$ equal to the current gain parameter value $\lambda_{curr}$ plus the gain incrementing value $\Delta\lambda$;

ix. after each repetition of steps v through ix, setting the estimated minimum gain parameter value $\lambda_{est}$ equal to whichever of the current value of the estimated minimum gain parameter value $\lambda_{est}$ and the current gain parameter value $\lambda_{curr}$ generated a lesser prediction error rate; and x. repeating steps v through ix of the until the current gain parameter value $\lambda_{curr}$ is equal to the final gain parameter value $\lambda_{final}$.

Additionally, the method of present invention may further include the step of fine-tuning the adjustable gain parameter $\lambda$ by performing, at least one repetition of the sub-steps of:

i. setting the initial gain parameter value $\lambda_{init}$ equal to the estimated minimum gain parameter value $\lambda_{est}$ minus the gain incrementing value $\Delta\lambda$;

ii. setting the final gain parameter value $\lambda_{final}$, equal to the estimated minimum gain parameter value $\lambda_{est}$ plus the gain incrementing value $\Delta\lambda$;

iii. generating a new gain incrementing value $\Delta\lambda$, with the new gain incrementing value $\Delta\lambda$ being smaller than the previous gain incrementing value $\Delta\lambda$;

iv. setting the current gain parameter value $\lambda_{curr}$ equal to the initial gain parameter value $\lambda_{init}$; and v. setting the estimated minimum gain parameter value $\lambda_{est}$ equal to the initial gain parameter value $\lambda_{init}$;

vi. training the neural network using the current gain parameter value $\lambda_{curr}$ to provide a trained neural network;

vii. inputting the validation data set into the trained neural network to generate an output data set;

viii. comparing the output data set generated by the trained neural network to the validation data set to determine the prediction error rate of the trained neural network;

ix. resetting the current gain parameter value $\lambda_{curr}$ equal to the current gain parameter value $\lambda_{curr}$ plus the gain incrementing value $\Delta\lambda$;

x. after each repetition of steps v through ix, setting the estimated minimum gain parameter value $\lambda_{est}$ equal to whichever of the current value of the estimated minimum gain parameter value $\lambda_{est}$ and the current gain parameter value $\lambda_{curr}$ generated a lesser prediction error rate; and xi. using the value of the estimated minimum gain parameter value $\lambda_{est}$ resulting from the step of fine-tuning the adjustable gain parameter $\lambda$ for training the neural network.

Furthermore, the neural network may also include a plurality i of input nodes $X_i$ for receiving inputs having a plurality N input features and a plurality j of hidden layer nodes $H_j$ with each of the plurality j of hidden layer nodes $H_j$ corresponding to one of a plurality j of rules, with one of a plurality j of rules including a plurality of antecedents A, and the sigmoid activation function f(x) is of the form:

$$f(x) = \frac{1}{1 + e^{-\lambda W_{ij} X_i}},$$

where $\lambda$ represents the adjustable gain parameter; $W_{ij}$ represents the weight between the plurality i of input nodes $X_i$, and a plurality j of hidden layer nodes $H_j$; and where each of the plurality of antecedents A of each one of the plurality j of rules is of the form:

$$A = \frac{2.2}{N\lambda_{est} W_{ij}},$$

where N represents the input features of the inputs i; $\lambda_{est}$ represents the estimated minimum gain parameter value; and $W_{ij}$ represents the weight between the plurality i of input nodes $X_i$, and a plurality j of hidden layer nodes $H_j$. Linguistic labels may additionally be provided for the clusters and cluster membership levels.

Also, the sigmoid activation function of the neural network provided may be further defined as including an adjustable bias threshold $T_j$, which is iteratively adjusted to minimize the error rate of the neural network, producing an estimated minimum bias threshold $T_{j,est}$; and the estimated minimum bias parameter value $T_{j,est}$ may used, along with the estimated minimum gain parameter value $\lambda_{est}$, to train the neural network. Steps similar to those described by i through x and a through f above may be used to adjust the adjustable bias threshold $T_j$ to find the estimated minimum bias parameter value $T_{j,est}$. In order to take into account the adjustable bias threshold $T_j$, the sigmoid activation function f(x) may take the form:

$$f(x) = \frac{1}{1 + e^{-\lambda W_{ij} X_i + T_j}},$$

where $\lambda$ represents the adjustable gain parameter, $W_{ij}$ represents the weight between the plurality i of input nodes $X_i$, and a plurality j of hidden layer nodes $H_j$; and where $T_j$ represents the adjustable bias threshold; and where each of the plurality of antecedents A of each rule is of the form:

$$A = \frac{2.2 - T_{j,est}}{N\lambda_{est} W_{ij}},$$

where $T_{j,est}$ represents the adjustable bias threshold, where N represents the input features of the inputs; $\lambda_{est}$ represents the estimated minimum gain parameter value $\lambda_{est}$; and $W_{ij}$ represents the weight between the plurality i of input nodes $X_i$, and a plurality j of hidden layer nodes $H_j$.

The system, or apparatus, of the present invention includes a neural network having a latent variable space and an error rate, with the neural network further including a sigmoid activation function having an adjustable gain parameter $\lambda$, with the gain parameter $\lambda$ iteratively adjusted to minimize the error rate of the neural network, and to produce an estimated minimum gain parameter value $\lambda_{est}$; a set of training data used, along with the estimated minimum gain parameter value $\lambda_{est}$, to train the neural network; and output clusters generated by projection of the training data set onto the latent variable space of the neural network, each of said output clusters having cluster membership levels and cluster centers with the cluster membership levels determined as a function of proximity with respect to the cluster centers. Linguistic labels may be applied to the output clusters and cluster membership levels. Additionally, the sigmoid activation function of the neural network may further include an adjustable bias threshold $T_j$, with the adjustable bias threshold $T_j$ iteratively adjusted to minimize the error rate of the neural network, and to produce an estimated minimum bias threshold $T_{j,est}$, and wherein the training data set is used, along with the estimated minimum bias threshold $T_{j,est}$ and the estimated minimum gain parameter value $\lambda_{est}$, to train the neural network.

BRIEF DESCRIPTION OF THE DRAWINGS

FIG. 4 provides a graphical representation of the sigmoid activation function, $$f(x) = \frac{1}{1+e^{-\lambda W_{ij}X_i + T_j}},$$

for various values of the gain parameter λ;

FIG. 6 presents a graphical representation of the sigmoid activation function, $$f(x) = \frac{1}{1+e^{-\lambda W_{ij}X_i + T_j}},$$

for various values of the threshold $T_j$;

DETAILED DESCRIPTION

The present invention relates to a fuzzy expert system that can derive interpretable rules which can explain learned knowledge from an artificial neural network in a comprehensible manner, and which is also compact in size and has a prediction accuracy that is better than, or at least equal to, the prediction accuracy of the neural network from which it was originally derived. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not to be limited to the embodiments shown, but is to be accorded the widest scope consistent with the principles and novel features disclosed herein.

The method of Benitez et al. described in the article "Are Artificial Neural Networks Black Boxes?", EEE Transactions on Neural Networks, Vol. 8, No. 5, September 1997, as discussed in the background, uses rule extraction based on the interactive-or operator. In particular, it can extract fuzzy rules, but humans do not easily understand the resulting rules because there is no assurance that the values of the input features, as represented in the antecedents of each fuzzy rule will fall within the allowable range of each input feature. Furthermore, the output values (consequents) are expressed as numeric values, which further reduces the understandability of the extracted values. Like the method of Benitez et al., the present invention uses the interactive-or operator to derive fuzzy rules from the artificial neural network. However, unlike the method developed by Benitez et al., the present invention: 1) ensures that the antecedents and consequents of each fuzzy rule are easily understandable by humans, 2) can be used to trim the number of input features in each rule, so as to make them small/compact, thus reducing memory requirements in hardware and 3) can predict with equal or greater accuracy than the neural network from which it was derived. Another advantage of the present invention is that it can be implemented on commercially available hardware (such as the HC12 microprocessor) with built-in fuzzy inference engines.

Figure 3:
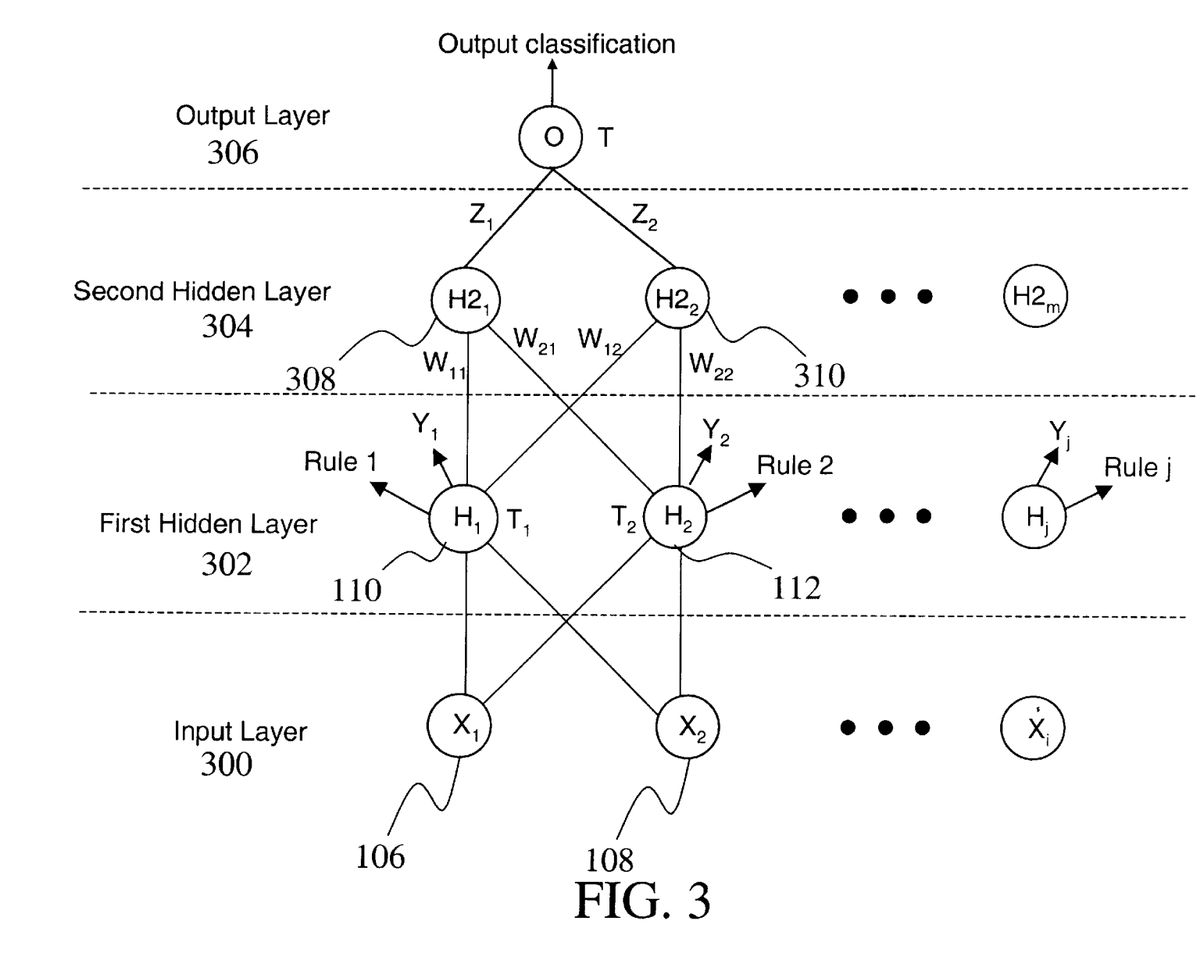
FIG. 3 presents a nodal and layer representation of a general artificial neural network developed for use with the present invention, including an input layer, a first hidden layer, a second hidden layer, and an output layer.

An embodiment of fuzzy expert system of the present invention is shown in FIG. 3, and includes an input layer 300, a first hidden layer 302, a second hidden layer 304, and an output layer 306. The number of rules j is equal to the number of nodes $H_j$ 308 in the first hidden layer 302. In order to make the antecedents of each rule j meaningful, the present invention uses a novel multi-stage gain and bias adjustment procedure as described below. Note that, the present invention is readily adaptable for the use of any number of stages, a two-stage adjustment procedure is discussed herein for illustrative purposes.

Figure 4:
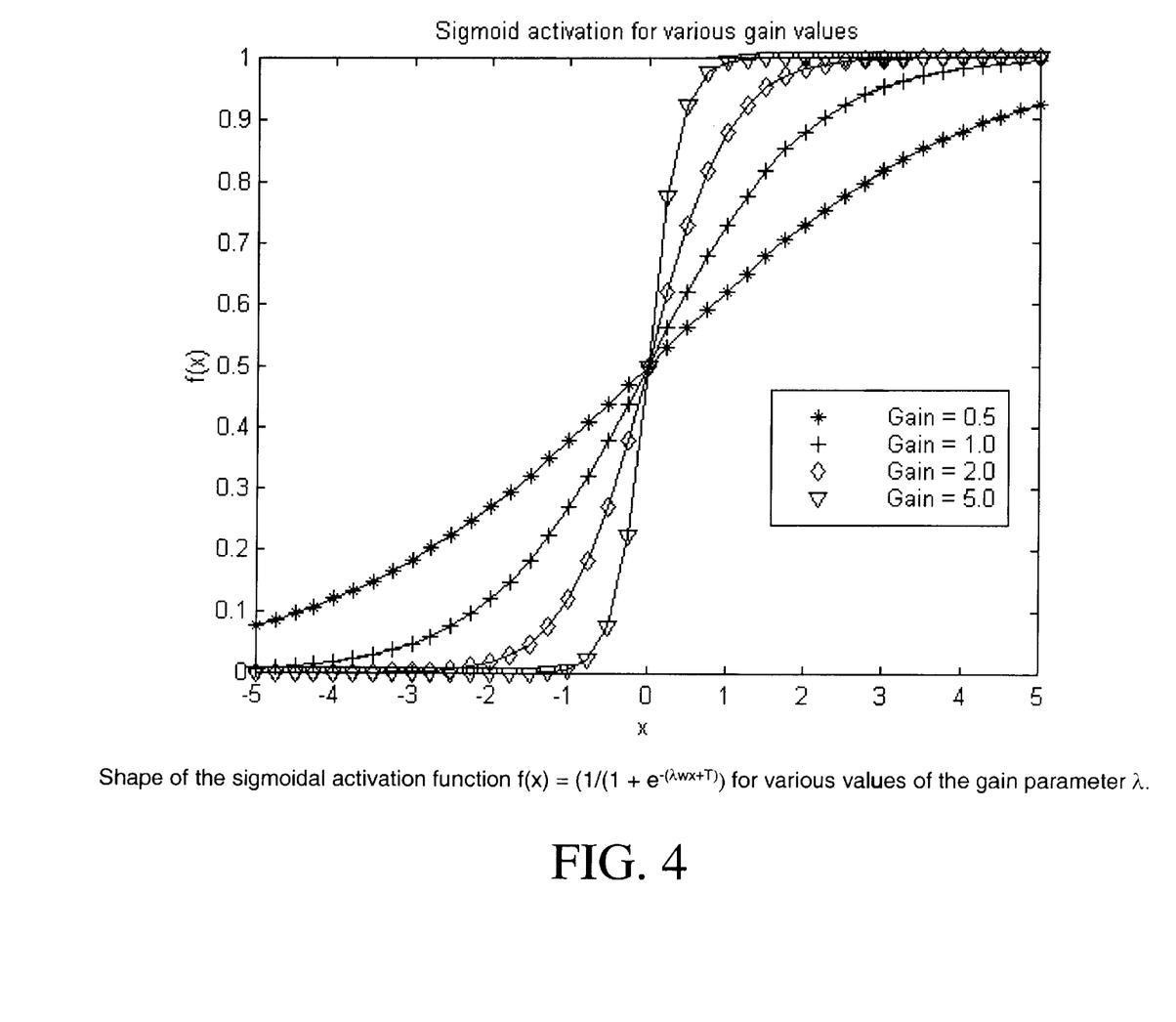

It is well known in the art that the value of the gain parameter λ in the sigmoidal activation function $$f(x) = \frac{1}{1+e^{-\lambda W_{ij}X_i + T_j}}$$

determines the steepness of the function. In particular, if λ increases then the slope becomes steeper, and vice versa. FIG. 4 shows the shape of the sigmoidal activation function $$f(x) = \frac{1}{1+e^{-\lambda W_{ij}X_i + T_j}}$$

for various values of the gain parameter λ. The value of the gain parameter λ has a direct effect on the range of antecedents in the rule extraction process. Thus, the antecedents of each rule with i input features will take the form of:

"If $\left(X_1 \text{ is greater/lower than approximately } \frac{2.2 - T_j}{N\lambda W_{ij}} \dots \right)$", depending on whether the sign of $W_{ij}$ is positive (for greater) or negative (for lower). The important point to note is that the gain parameter λ acts as a variable gain and is used in the present invention to keep the antecedent values within the range of the input values (i.e, within the range used to train the neural network). By keeping the antecedent values within the range used to train the neural network, the rules are made meaningful. In order to determine the appropriate gain parameter λ, an embodiment of the present invention uses a novel multi-stage gain and bias adjustment procedure, discussed herein as a two-stage adjustment procedure. Utilizing a two-stage adjustment procedure, in the first stage, called the coarse gain adjustment stage, the goal is to perform a coarse search for an appropriate gain parameter λ. In this stage, a neural network with a fixed architecture is trained with different values of the gain parameter λ. The invention takes advantage of the fact that keeping the gain parameter λ in a lower range (typically <1) prevents the hidden layer nodes $H_j$ from becoming saturated during training. This is because, as can be seen from FIG. 4, a lower value of the gain parameter λ tends to produce a more linear operating range.

Figure 5:
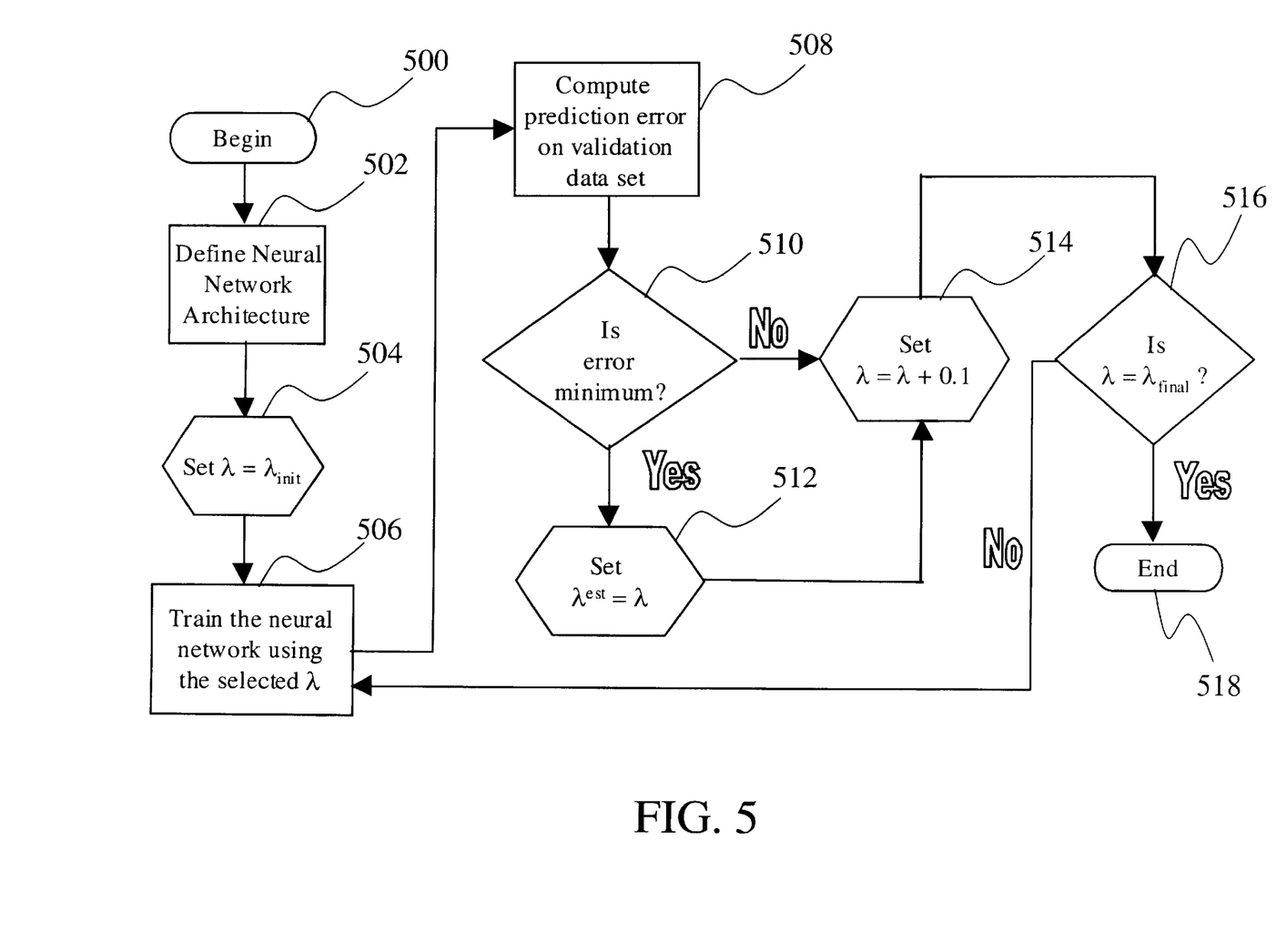
FIG. 5 provides a flow chart demonstrating the coarse gain-adjustment method of the present invention.

The coarse gain adjustment stage is completed after selecting a value for the gain parameter λ that results in the lowest prediction error on a validation data set. FIG. 5 presents a flowchart outlining the coarse gain adjustment stage. As shown, after the beginning 500 of the coarse gain adjustment stage, the neural network is generated in a neural network defining step 502. Next, the gain parameter λ is set to an initial value estimate $\lambda_{init}$ in an initialization step 504. The neural network generated in the neural network defining step 502 is then trained using the initial value estimate $\lambda_{init}$ set in the initialization step 504 in an initial training step 506.

Next, the neural network is tested to determine the prediction error using a validation data set in a validation step 508. The results of the validation step 508 are then checked to determine if the error is the minimum in an error checking step 510. If the error is the minimum, then the estimated $\lambda$ is stored in memory in an estimation storage step 512. Next, the gain parameter $\lambda$ is incremented upward by a certain amount in a gain-adjustment step 514. In FIG. 5, this amount is given as 0.1, although any desired increment may be chosen depending on the particular application. Regardless of whether error was found to be a minimum, the gain parameter $\lambda$ is still incremented upward by the gain-adjustment step 514. The method then checks the level of the gain parameter $\lambda$ to determine whether a predetermined gain level $\lambda_{final}$ has been reached, as represented by the predetermined gain level $\lambda_{final}$ check step 516. If the predetermined gain level $\lambda_{final}$ has been reached, then the the routine is ended 518. Until the routine is ended 518, the neural network is retrained using the initial training step 506 with the current gain parameter $\lambda$ substituted for the previous gain level used for training (i.e. the initial value estimate $\lambda_{init}$ is replaced in the second pass through the routine). The initial training step 506, the validation step 508, the error checking step 510, the estimation storage step 512, and the gain-adjustment step 514 are repeated until a predetermined gain level $\lambda_{final}$ has been reached, as represented by 516, and the routine is ended 518. Thus, the network is continually retrained with increasing gain levels, while the gain level yielding the smallest error to the current point is stored in memory. A predetermined maximum gain level is set, and once the increasing gain reaches the predetermined maximum gain level, the routine ends. Thus, the gain within a predetermined range yielding the minimum error is determined. It is imporant to note that although the gain-adjustment step 514 is shown in FIG. 5 as a linear, incrementally increasing function, it could also take other forms such as a decrementing function or a non-linear function.

Figure 6:
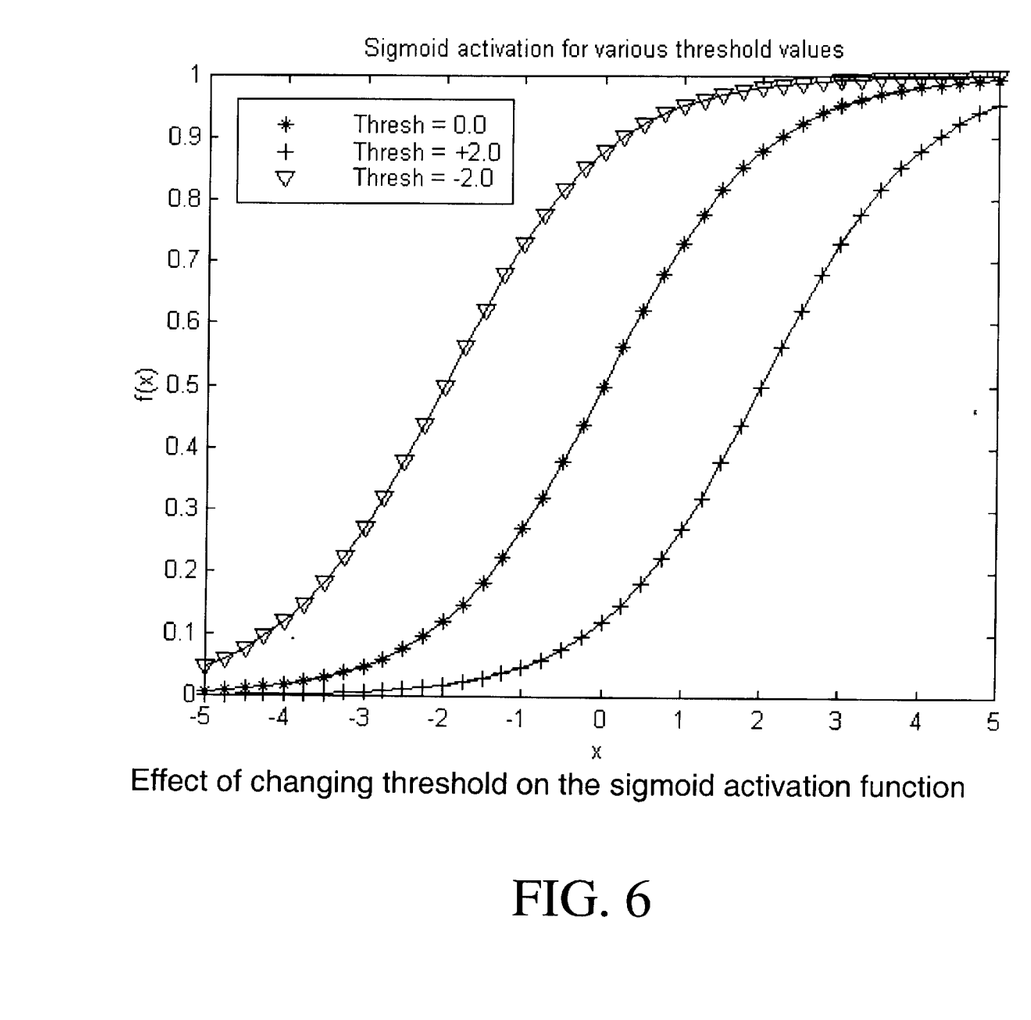

For all the tested performance evaluations, the values of initial value estimate $\lambda_{init}$ and the predetermined gain level $\lambda_{final}$ as 0.1 and 1.0, respectively, were found to be adequate. The second stage, called the fine gain and bias-adjustment stage, is then initiated. In this stage, the gain parameter $\lambda$ and bias threshold $T_j$ of the trained network are fine-tuned in the neighborhood of the minimum gain parameter $\lambda$ value obtained from the first stage. The fine-tuning method with respect to the gain parameter $\lambda$ is the essentially the same as that for the coarse adjustment as depicted in FIG. 5, except that it uses a smaller increment in the gain-adjustment step 514, and it increments across a region the size of the gain-adjustment step 514 which was used in the coarse adjustment stage. For example, if the coarse gain-adjustment stage was run between 0 and 1 in increments of 0.1, with a minimum found at 0.7, the fine gain adjustment would be run between 0.6 and 0.7 with an increment of 0.01 to find a more finely adjusted gain exhibiting minimal error. The bias threshold $T_j$ is then adjusted in a manner similar to that used for the gain parameter $\lambda$ in the coarse gain-adjustment stage. It is important to note that both the gain-parameter $\lambda$ and bias threshold $T_j$ may be adjusted in multiple stages. Typically, the bias threshold $T_j$ will be adjusted closely before, or after, the last gain-adjustment stage. The exact configuration of the gain parameter $\lambda$ and bias threshold $T_j$ adjustment will depend on the needs of the particular system, i.e. how accurate it must be. After all adjustments have been completed, the pair that minimizes the predictive error on the validation set used in the first stage is selected as the final estimate (i.e., the final gain estimate $\lambda^{est}$ and the final bias threshold estimate $T_j^{est}$). The gain and bias adjustment stages thus provide means for iteratively adjusting and estimating the gain parameter $\lambda$ and the bias threshold $T_j$. The bias-adjustment shift via changes in the bias threshold $T_j$ may be visualized as shifting the sigmoidal function parallel to the input axis as shown in FIG. 6. Note that the coarse and fine provides a means for iteratively adjusting the gain parameter $\lambda$.

In fuzzy logic, the bias-adjustment method described above is akin to shifting the membership functions along the universe of discourse of each input $X_i$. The bias-adjustment method also helps to refine the antecedents of each rule because, as previously indicated,the bias threshold $T_j$ is involved in their development. While the final gain estimate $\lambda^{est}$ obtained using the two-stage adjustment procedure discussed herein is fixed across all rules, it is straightforward to extend the procedure to obtain a separate estimate of the gain parameter $\lambda$ for each rule. Once the final gain estimate $\lambda^{est}$ and the final bias threshold estimate $T_j^{est}$ have been developed using the coarse and fine adjustment procedure, an antecedent pruning step is performed for each rule. In this step, those antecedents for which the inputs exceed the value of $$\frac{2.2 - T_{j,est}}{N\lambda_{est}W_{ij}}$$

are removed, thus filtering out those antecedents out of the range of possible inputs and forcing the antecedents of each rule to be meaningful.

In order to provide-meaningful labels to the consequents of each rule, a second hidden layer 304 in the neural network is used, as was shown relative to FIG. 3. Using this second hidden layer 304, it is possible to project any high-dimensional input space into a non-linear low dimensional latent variable space. Once the neural network is trained, the training data is projected into an m-dimensional latent variable space, where m is typically two or three depending on whether the network is being used for object recognition in two dimensions or three dimensions. Herein, an m of two is used to demonstrate a two-dimensional latent variable space by using two second hidden layer nodes $H2_1$ 308 and $H2_2$ 310 in the second hidden layer 304 of the neural network. The two-dimensional coordinates of each projected input are obtained as the activation of the two second hidden layer nodes $H_1$ 308 and $H_2$ 310. Each projected point is also assigned the correct class label for a given input $X_i$. After all the training data has been presented, the two-dimensional non-linear projection space will contain clusters of various output classes. The cluster center for each class is then identified. Linguistic labels for outputs are assigned based on both the distance between the projected input and the class with the nearest cluster center, and the standard deviation of the distance between members within that class. For example, if an input is identified as belonging to class A, then a linguistic label such as "Strongly Class A" is assigned if the distance of the projected point is within a radius of $\sigma_A$ (one standard deviation of class A). Similarly, the same or other fuzzy labels such as "Strong", "Moderate", etc. are to the consequent of each rule, depending on how far the resultant projected point is from the cluster center. In summary, the method of the present invention allows the antecedents and consequents of each fuzzy rule to be easily interpreted by humans by constraining the antecedents to the range of inputs and by providing consequent labels. The antecedent pruning step helps to reduce the number of input features used by each rule, and thus aids in reducing the complexity of each rule. An additional benefit is that the pruned inputs help to prevent the sigmoidal function of each rule from saturating, and thus result in an improved prediction performance on test data sets.

Several experiments have been performed which evaluate the method using a one-dimensional Infrared range profile sensor data for smart airbag applications in automobiles. The sensor data contained 40 features: 20 beams with range information for the occupant in the car seat measured from a fixed location in the car; and 20 additional signals measured at each beam location that provides a measure of the strength/intensity of the signal reflected from the car seat back to the sensor. Two separate data sets were collected on a real automobile using these sensor features. In the first data set, called occupant recognition data, the classification task was to decide whether to enable or disable an airbag based on the type of occupant. For example, the airbag should be disabled if a rear-facing infant seat was placed on the seat. In the second data set, called occupant position data, the classification task was the same, but was based on the position of the occupant with respect to the instrument panel in front of the seat. For example, if the occupant is too close to the instrument panel, the decision should be to disable the airbag. The method disclosed herein was applied to these classification tasks to extract a fuzzy expert system with rules.

Figure 7:
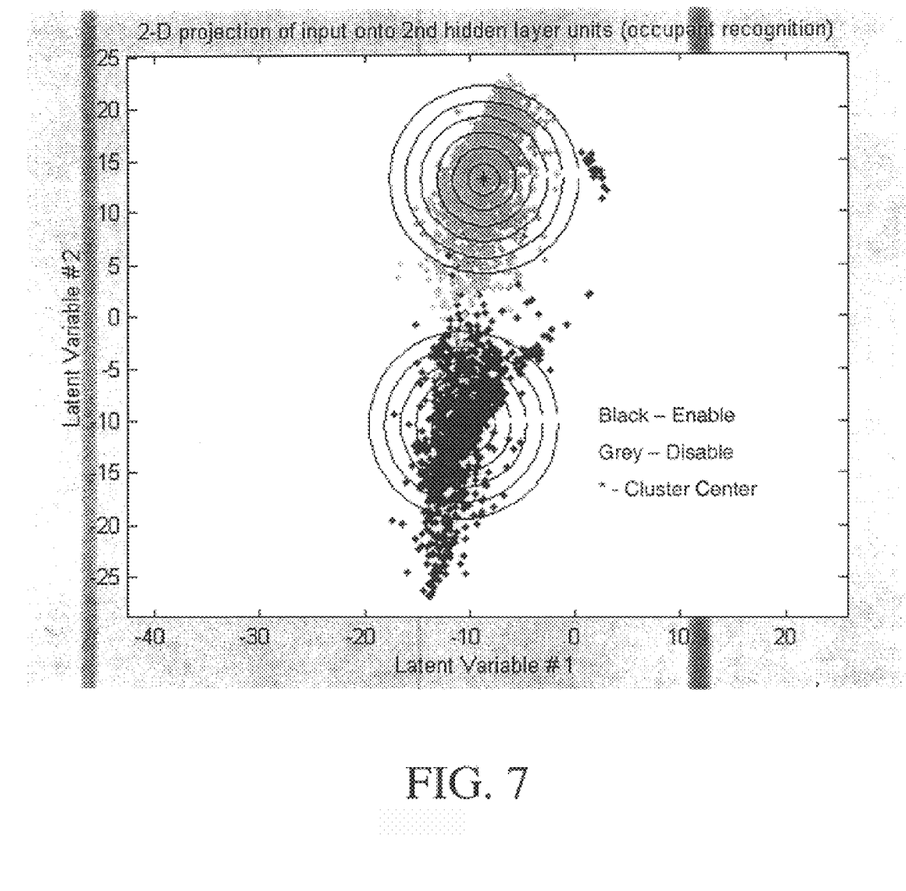
FIG. 7 provides a graphical representation of a two-dimensional projection of inputs onto two second hidden layer nodes as applied to automobile occupant recognition.

The two dats sets were used to train a two hidden layer neural network based on the backpropapagation learning method with noise injection. The trained neural network was then used to extract rules using the approach of the present invention. The antecedents were extracted using the two-stage gain and bias adjustment procedure embodiment of the present invention discussed herein followed by the rule-pruning step as described above. The consequents were extracted using the two-dimensional non-linear projection of input data onto the two units in the second hidden layer. An example of the portioning of the projected space for the occupant recognition data is shown in FIG. 7, with the projection of inputs $X_i$ onto the two-dimensional latent variable space (using the second hidden layer units), is shown. Using the cluster centers and the ($\sigma_{enable}$, $\sigma_{disable}$) curves (marked as equally spaced circles for simplicity), meaningful fuzzy labels for the consequents can be generated. The two asterisks amidst the disable and enable clusters represent the two cluster centers. The equally spaced circles represent the ($\sigma_{enable}$, $\sigma_{disable}$) curves. Using the cluster centers and the ($\sigma_{enable}$, $\sigma_{disable}$) curves, meaningful labels for the consequents can be extracted. For example, the inner circle surrounding each cluster center could be labeled 'Strongly Enable' and 'Strongly Disable'. Preferably, the ($\sigma_{enable}$, $\sigma_{disable}$) curves should be formed as contour lines in order to better represent the shape of the clusters, and thus improve labeling accuracy. FIG. 7 is included merely as an illustration of a simple method that may be applied to assign labels to the consequents of each rule based on the projection of input space onto the two-dimensional latent variable space.

Figure 8:
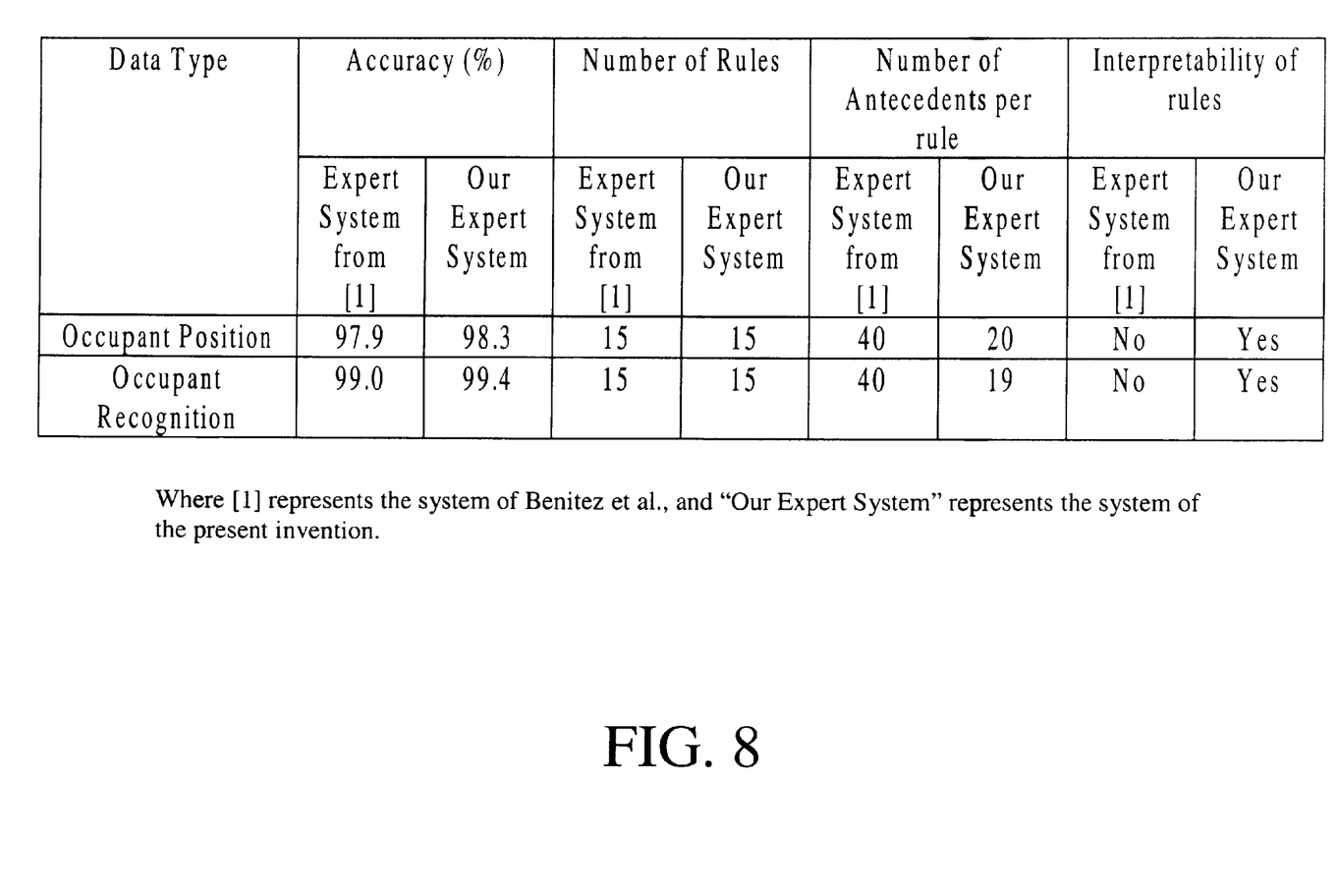
FIG. 8 provides a comparison table to demonstrate the relative accuracy, number of rules, number of antecedents per rule, and the interpretability of the rules of the present invention versus the method of Benitez et al.

A comparison of the performance of the method of the present invention for occupant position sensing and recognition presented in FIG. 8. Four different performance measures were used to generate the table of FIG. 8. The first measure is accuracy in prediction performance on test data (i.e., not the training data set). The accuracy of the prediction on the test set using the present invention was better than the accuracy of the prediction on the test set using method of Benitez et al. The second measure used was the number of rules (i.e., the number of hidden layer nodes). This was found to be the same for both methods. The third measure was the number of antecedents per rule. Using the method of the present invention, the number of antecedents was halved relative to the method of Benitez et. The last measure is the interpretability of the rules extracted. It was found that by using the method of the present invention, the rules were easily interpretable. This stems directly from the rule pruning step that was based on the multi-stage gain and bias adjustment procedure. In summary, these results show that the present invention not only provides increased accuracy, but also provides a more compact and interpretable rule set. Furthermore, the method of the present invention provides a more compact rule set with somewhat greater accuracy than that yielded by C5.

What is claimed is:

1. A method for interpretable rule extraction from neural networks comprising the steps of:
  a. providing a neural network having a latent variable space and an error rate, said neural network further including a sigmoid activation function having an adjustable gain parameter $\lambda$;
  b. iteratively adjusting the adjustable gain parameter $\lambda$ to minimize the error rate of the neural network, producing an estimated minimum gain parameter value $\lambda_{est}$;
  c. using the estimated minimum gain parameter value $\lambda_{est}$ and a set of training data to train the neural network; and
  d. projecting the training data onto the latent variable space to generate output clusters having cluster membership levels and cluster centers, with said cluster membership levels being determined as a function of proximity with respect to said cluster centers.

2. A method for interpretable rule extraction from neural networks as set forth in claim 1, wherein:
  a. the neural network provided in step a of claim 1 further includes a plurality of inputs and an output, and wherein the latent variable space of the neural network further includes at least one latent variable node having an activation point;
  b. the iterative adjustment of adjustable gain parameter $\lambda$ in step b of claim 1 is further defined by the sub-steps of:
    i. providing a validation data set;
    ii. setting an initial gain parameter value $\lambda_{init}$, a current gain parameter value $\lambda_{curr}$, a final gain parameter value $\lambda_{final}$, a gain incrementing value $\Delta\lambda$, and an estimated minimum gain parameter value $\lambda_{est}$;
    iii. setting the current gain parameter value $\lambda_{curr}$ equal to the initial gain parameter value $\lambda_{init}$;
    iv. setting the estimated minimum gain parameter value $\lambda_{est}$ equal to the initial gain parameter value $\lambda_{init}$;
    v. training the neural network using the current gain parameter value $\lambda_{curr}$ to provide a trained neural network;
    vi. inputting the validation data set into the trained neural network to generate an output data set;
    vii. comparing the output data set generated by the trained neural network to the validation data set to determine the prediction error rate of the trained neural network;
    viii. resetting the current gain parameter value $\lambda_{curr}$ equal to the current gain parameter value $\lambda_{curr}$ plus the gain incrementing value $\Delta\lambda$;
    ix. after each repetition of steps v through ix, setting the estimated minimum gain parameter value $\lambda_{est}$ equal to whichever of the current value of the estimated minimum gain parameter value $\lambda_{est}$ and the current gain parameter value $\lambda_{curr}$ generated a lesser prediction error rate; and x. repeating steps v through ix of the present claim until the current gain parameter value $\lambda_{curr}$ is equal to the final gain parameter value $\lambda_{final}$; and c. the estimated minimum gain parameter value $\lambda_{est}$ used to train the neural network is the estimated minimum gain parameter value $\lambda_{est}$ resulting after sub-step ix of step b of the present claim; and d. the projecting of the training data onto the latent variable space of step d of claim 1 is performed to set the activation points of the latent variable nodes to generate output clusters having cluster membership levels and cluster centers, with said cluster membership levels being determined as a function of proximity with respect to said cluster centers.

3. A method for interpretable rule extraction from neural networks as set forth in claim 2, further including the step of fine-tuning the adjustable gain parameter $\lambda$ by performing, after step b of claim 2, at least one repetition of the sub-steps of:

i. setting the initial gain parameter value $\lambda_{init}$ equal to the estimated minimum gain parameter value $\lambda_{est}$ minus the gain incrementing value $\Delta\lambda$ from step b;

ii. setting the final gain parameter value $\lambda_{final}$ equal to the estimated minimum gain parameter value $\lambda_{est}$ plus the gain incrementing value $\Delta\lambda$ from step b;

iii. generating a new gain incrementing value $\Delta\lambda$, with the new gain incrementing value $\Delta\lambda$ being smaller than the previous gain incrementing value $\Delta\lambda$;

iv. setting the current gain parameter value $\lambda_{curr}$ equal to the initial gain parameter value $\lambda_{init}$; and v. repeating sub-steps iv through ix of step b of claim 2;

vi. using the value of the estimated minimum gain parameter value $\lambda_{est}$ resulting from the step of fine-tuning the adjustable gain parameter $\lambda$ in step c of claim 1 for training the neural network.

4. A method for interpretable rule extraction from neural networks as set forth in claim 1, wherein the neural network provided in step a of claim 1 further includes a plurality i of input nodes $X_i$ for receiving inputs having a plurality N input features and a plurality j of hidden layer nodes $H_j$ with each of the plurality j of hidden layer nodes $H_j$ corresponding to one of a plurality j of rules, with one of a plurality j of rules including a plurality of antecedents A, and the sigmoid activation function f(x) is of the form:

$$f(x) = \frac{1}{1+e^{-\lambda W_{ij} X_i}},$$

where $\lambda$ represents the adjustable gain parameter; $W_{ij}$ represents the weight between the plurality i of input nodes $X_i$, and a plurality j of hidden layer nodes $H_j$; and where each of the plurality of antecedents A of each one of the plurality j of rules is of the form:

$$A = \frac{2.2}{N\lambda_{est} W_{ij}},$$

where N represents the input features of the inputs i; $\lambda_{est}$ represents the estimated minimum gain parameter value; and $W_{ij}$ represents the weight between the plurality i of input nodes $X_i$, and a plurality j of hidden layer nodes $H_j$.

5. A method for interpretable rule extraction from neural networks as set forth in claim 1, wherein the clusters and cluster membership levels generated in step d of claim 1 are provided with linguistic labels.

6. A method for interpretable rule extraction from neural networks as set forth in claim 3, wherein:

a. the sigmoid activation function of the neural network provided in step a of claim 1 further includes an adjustable bias threshold $T_j$;

b. between steps a and c of claim 1, is included the additional step of iteratively adjusting the adjustable bias threshold $T_j$ to minimize the error rate of the neural network, producing an estimated minimum bias threshold $T_{j,est}$; and c. the estimated minimum bias threshold $T_{j,est}$ is used along with the estimated minimum gain parameter value $\lambda_{est}$ in step c of claim 1 to train the neural network.

7. A method for interpretable rule extraction from neural networks as set forth in claim 6, wherein the clusters and cluster membership levels generated in step d of claim 1 are provided with linguistic labels.

8. A method for interpretable rule extraction from neural networks as set forth in claim 6, wherein step b of claim 6 is further defined by the steps of:

a. adjusting the adjustable bias threshold $T_j$ by the sub-steps of:

i. setting an initial bias threshold value $T_{j,init}$, a current bias parameter value $T_{j,curr}$, a final bias parameter value $T_{j,final}$, a bias incrementing value $\Delta T_j$, and an estimated minimum bias parameter value $T_{j,est}$;

ii. setting the current bias parameter value $T_{j,curr}$ equal to the initial bias threshold value $T_{j,init}$;

iii. setting the estimated minimum bias parameter value $T_{j,est}$ equal to the initial bias threshold value $T_{j,init}$;

iv. training the neural network using the current bias parameter value $T_{j,curr}$ to provide a trained neural network;

v. inputting the validation data set into the trained neural network to generate an output data set;

vi. comparing the output data set generated by the trained neural network to the validation data set to determine the prediction error rate of the trained neural network;

vii. resetting the current bias parameter value $T_{j,curr}$ equal to the current bias parameter value $T_{j,curr}$ plus the bias incrementing value $\Delta T_j$;

viii. after each repetition of sub-steps v through vii of step b of the present claim, setting the estimated minimum bias parameter value $T_{j,est}$ equal to whichever of the current value of the estimated minimum bias parameter value $T_{j,est}$ and the current bias parameter value $T_{j,curr}$ generated a lesser prediction error rate; and ix. repeating sub-steps iv through viii of the present claim until the current bias parameter value $T_{j,curr}$ is equal to the final bias parameter value $T_{j,final}$; and b. the estimated minimum bias threshold $T_{j,est}$ used along with the estimated minimum gain parameter value $\lambda_{est}$ in step c of claim 1 to train the neural network is that from sub-step viii of the present claim.

9. A method for interpretable rule extraction from neural networks as set forth in claim 8, further including the step of fine-tuning the adjustable bias threshold $T_j$ by performing, after step a of claim 8, at least one repetition of the sub-steps of:

a. setting the initial bias threshold value $T_{j,init}$ equal to the estimated minimum bias parameter value $T_{j,est}$ minus the bias incrementing value $\Delta T_j$ from step a of claim 8;

b. setting the final bias parameter value $T_{j,final}$, equal to the estimated minimum bias parameter value $T_{j,est}$ bias incrementing value $\Delta T_j$ from step a of claim 8;

c. generating a new bias incrementing value $\Delta T_j$, with the new bias incrementing value $\Delta T_j$ being smaller than the previous bias incrementing value $\Delta T_j$;

d. setting the current bias parameter value $T_{j,curr}$ equal to the initial bias threshold value $T_{j,init}$; and e. repeating sub-steps iv through viii of step a of claim 8;

f. using the value of the estimated minimum bias parameter value $T_{j,est}$ from step a of claim 8 along with the estimated minimum gain parameter value $\lambda_{est}$ developed in step c of claim 1 to train the neural network provided in step a of claim 1.

10. A method for interpretable rule extraction from neural networks as set forth in claim 8, wherein the neural network provided in step a of claim 1 further includes a plurality i of input nodes $X_i$, and a plurality j of hidden layer nodes $H_j$ with each of the plurality j of hidden layer nodes $H_j$ corresponding to one of a plurality j rules, with one of a plurality j rules including a plurality of antecedents A, and the sigmoid activation function f(x) is of the form:

$$f(x) = \frac{1}{1 + e^{-\lambda W_{ij} X_i + T_j}},$$

where $\lambda$ represents the adjustable gain parameter, $W_{ij}$ represents the weight between the plurality i of input nodes $X_i$, and a plurality j of hidden layer nodes $H_j$; and where $T_j$ represents the adjustable bias threshold; and where each of the plurality of antecedents A of each rule is of the form:

$$A = \frac{2.2 - T_{j,est}}{N \lambda_{est} W_{ij}},$$

where $T_{j,est}$ represents the adjustable bias threshold, where N represents the input features of the inputs; $\lambda_{est}$ represents the estimated minimum gain parameter value $\lambda_{est}$; and $W_{ij}$ represents the weight between the plurality i of input nodes $X_i$, and a plurality j of hidden layer nodes $H_j$.

11. A method for interpretable rule extraction from neural networks as set forth in claim 10, wherein the output clusters and cluster membership levels generated in step d of claim 1 are provided with linguistic labels.

12. A fuzzy rule set developed by the method of claim 1.

13. A fuzzy rule set developed by the method of claim 5.

14. A fuzzy rule set developed by the method of claim 6.

15. A fuzzy rule set developed by the method of claim 7.

16. An apparatus for interpretable rule extraction from neural networks comprising:

a. a neural network having a latent variable space and an error rate, said neural network further including a sigmoid activation function having an adjustable gain parameter $\lambda$, with the gain parameter $\lambda$ iteratively adjusted to minimize the error rate of the neural network, and to produce an estimated minimum gain parameter value $\lambda_{est}$;

b. a set of training data used, along with the estimated minimum gain parameter value $\lambda_{est}$, to train the neural network; and c. output clusters generated by projection of the training data set onto the latent variable space of the neural network, each of said output clusters having cluster membership levels and cluster centers with the cluster membership levels determined as a function of proximity with respect to the cluster centers.

17. An apparatus for interpretable rule extraction from neural networks as set forth in claim 16, wherein the clusters and cluster membership levels are provided with linguistic labels.

18. An apparatus for interpretable rule extraction from neural networks as set forth in claim 16, wherein the sigmoid activation function of the neural network further includes an adjustable bias threshold $T_j$, with the adjustable bias threshold $T_j$ iteratively adjusted to minimize the error rate of the neural network, and to produce an estimated minimum bias threshold $T_{j,est}$, and wherein the training data set is used, along with the estimated minimum bias threshold $T_{j,est}$ and the estimated minimum gain parameter value $\lambda_{est}$, to train the neural network.

19. An apparatus for interpretable rule extraction from neural networks as set forth in claim 18, wherein the output clusters and cluster membership levels are provided with linguistic labels.

\* \* \* \* \*